United States Patent
Sohn

(10) Patent No.: US 6,212,973 B1
(45) Date of Patent: Apr. 10, 2001

(54) SELF-COMPENSATING DYNAMIC BALANCER

(75) Inventor: Jin-Seung Sohn, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/234,371

(22) Filed: Jan. 21, 1999

(51) Int. Cl.[7] ............... F16F 15/22; G05G 1/00; H05K 5/24; G11B 17/02
(52) U.S. Cl. ............... 74/573 R; 74/572; 310/51; 360/99.12
(58) Field of Search .............. 74/572–574; 360/99.12; 310/51; 219/117.1; 53/83; 68/23.2; 417/423.7; 416/145; 188/267, 378

(56) References Cited

U.S. PATENT DOCUMENTS

| | | | |
|---|---|---|---|
| 3,854,347 | * 12/1974 | Hellerich | 74/573 R |
| 4,674,356 | * 6/1987 | Kilgore | 74/573 R |
| 4,905,776 | * 3/1990 | Beynet et al. | 74/573 R X |
| 5,256,037 | * 10/1993 | Chatelain | 417/423.7 |
| 5,593,281 | * 1/1997 | Tai | 416/145 |
| 5,605,078 | * 2/1997 | Taylor et al. | 74/573 R |
| 5,690,017 | * 11/1997 | Riedlinger | 92/100 |
| 5,906,756 | * 5/1999 | Lee et al. | 219/117.1 |
| 5,941,133 | * 8/1999 | Wierzba et al. | 74/573 F |
| 6,005,749 | * 12/1999 | Ikuta et al. | 360/99.12 |
| 6,065,368 | * 5/2000 | Sohn | 74/573 R |

* cited by examiner

Primary Examiner—Vinh T. Luong
(74) Attorney, Agent, or Firm—Robert E. Bushnell, Esq.

(57) ABSTRACT

In a self-compensating dynamic balancer, a main body is installed at a rotating body to restrict internal vibrations due to eccentric mass of the rotating body. The main body has a circular race formed therein around a rotation shaft of the rotating body. A plurality of rigid bodies are disposed in the race to be capable of moving freely and are as many as necessary to occupy at least half of the inner space of the race.

12 Claims, 3 Drawing Sheets

SELF-COMPENSATING DYNAMIC BALANCER

BACKGROUND OF THE INVENTION

Field of the Invention

The present invention relates to a self-compensating dynamic balancer, and more particularly, to a process and a self-compensating dynamic balancer providing an improved structure to reduce the effect of a frictional force.

Description of the Related Art

In a typical rotating body, the center of rotation and the center of gravity of the rotating body, do not match due to eccentric mass caused by an error during the manufacturing process. I have noticed that when the rotating body having a center of rotation which does not match the center of gravity rotates, the center of rotation revolves, i.e., whirls. As a result, internal vibrations are generated in the rotating body, particularly in a radial direction.

SUMMARY OF THE INVENTION

It is an object of the present invention to provide an improved self-compensating balancer and process for self-compensated balancing of rotating devices.

It is another object to provide a self-compensating dynamic balancer which restricts deterioration of balancing capability due to a frictional force by adjusting the number of rigid bodies disposed in the race.

It is further object to provide an improved self-compensating dynamic balancer with lubricant covering the surface of said rigid bodies and said race to reduce the friction between said rigid bodies and said race.

These and other objects may be achieved with a self-compensating dynamic balancer with: a main body installed at a rotating body to restrict internal vibrations due to eccentric mass of the rotating body and having a circular race formed therein around a rotation shaft of the rotating body; and a plurality of rigid bodies disposed in the race to be capable of moving freely, wherein there are as many rigid bodies as necessary to occupy at least half of the inner space of the race.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
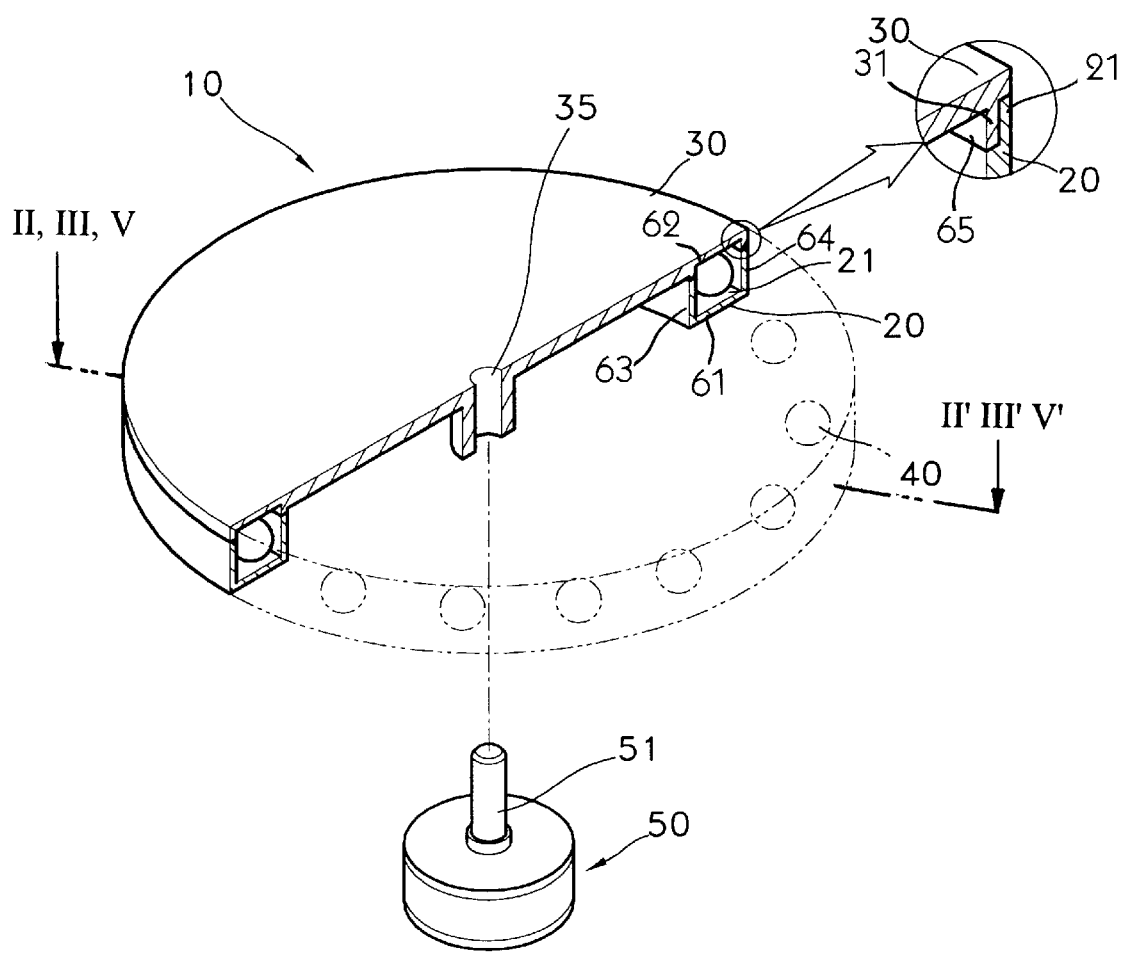
FIG. 1 is a partially cut-away perspective view generically illustrating a typical self-compensating dynamic balancer that is suitable for the practice of the present invention.
Figure 2:
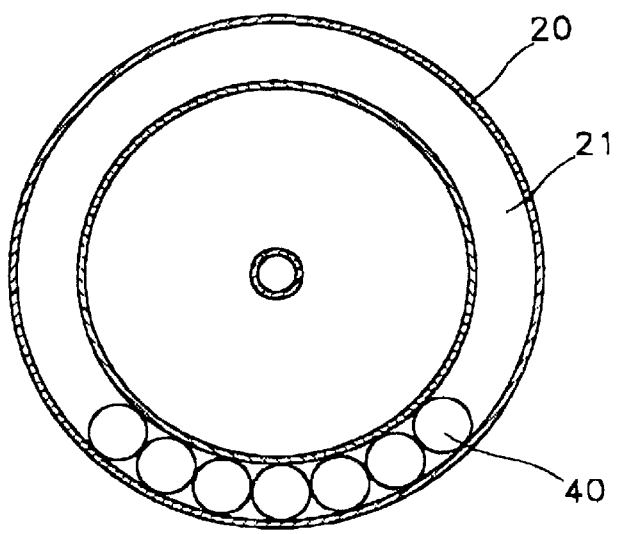
FIG. 2 is a sectional view of a general dynamic balancer taken along line II—II' of FIG. 1.

Referring to FIG. 2, typical dynamic balancer includes a housing 2, a race 3 formed on the housing 2, and rigid bodies 4 moving within race 3. FIG. 1 shows a self-compensating dynamic balancer for having a rotation body and a driving source rotating the rotation body reducing internal vibrations. The rotation body includes a case 10 and a plurality of rigid bodies 40 in the case 10. The case 10 consists of a main body 20 having an opening at the upper side thereof and a cover member 30 for covering the opening of the main body 20. The main body 20 has a hollow circular race 21 which is formed therein for accommodating the rigid bodies 40. The hollow circular race 21 defines an inner side 63, an outer side 64, and upper side 62, and a lower side 61. A first circumferential side 31 extended from cover member 30 and a second circumferential side 21 extended from main body 20 from the outer side 64. Each end portion of first and second circumferential sides 21 and 31 overlaps each other within the outer side 64. A seam 65 formed between the first and second circumferential sides 21 and 31 does not contact rigid bodies.

A coupling hole 35 into which a rotation shaft 51 of a driving source 50 is inserted and coupled is formed at the center Cn of the cover member 30. The race 21 is a space in which the rigid bodies 40 freely move and rotates around the coupling hole 35. Thus, when the case 10 rotates, the rigid bodies 40 tend to move away from the center Cn of rotation, i.e., the coupling hole 35, due to a centrifugal force Cf. Here, when the rotation shaft 51 revolves due to the eccentric mass Mce, the rigid bodies 40 are disposed at the position opposite to the center Ce of revolution with respect to the rotation shaft 51 and thus reduce the internal vibrations generated due to the eccentric mass Mce.

As described above, the self-compensating dynamic balancer having the above structure reduces the internal vibrations due to the unbalanced mass Mu of the rotating body, by determining the diameter of the race 21 forming a circle, the number of rigid bodies 40, and the diameter and mass of each rigid body 40, considering the normal rotation speed of the rotating body.

In the typical dynamic balancer, considering the compensation capability of unbalanced mass, simplification of structure of the rigid bodies 40, and cost reduction, as shown in FIG. 2, the number of rigid bodies 40 to be used is determined to occupy less than half of the inner space of the race 21.

Here, when a few rigid bodies 40 placed in the race 21 move slowly due to frictional force against the race 21, fine balancing is not possible. Also, since there is a difference in movement of the rigid bodies 40, reproducibility is lowered. Here, it is a characteristic feature of the present invention that as many rigid bodies 40 as necessary to occupy more than half of the inner space of the race 21 are disposed in the race 21.

Figure 3:
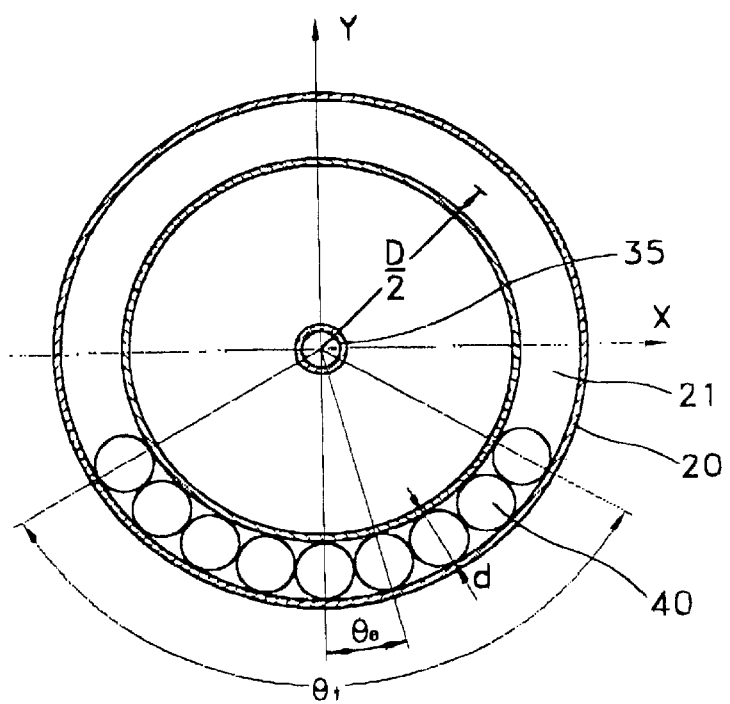
FIG. 3 is a sectional view of a self-compensating dynamic balancer taken along line III—III' of FIG. 1 for explaining the compensation capability of the self-compensating dynamic balancer.

FIG. 3 shows an example in which unbalanced mass Mu is positioned in a direction of the +Y axis and the rigid bodies 40 are positioned in a direction of −Y directions. As shown in FIG. 3, assuming that the radius of the center Cn of the race 21 is D/2, that the mass of each rigid body is m and that the diameter of each rigid body is d, the maximum compensation capability of the self-compensating dynamic balancer can be obtained from the following equations.

The angle $\theta_e$ between two radial lines intersecting said axis and neighboring rigid bodies is obtained from the following equation.

$$\theta_e \cong 2\tan^{-1}(d/D) \quad \text{[Equation 1]}$$

When n units of the rigid bodies 40 are situated close to each other, the angle $\theta_T$ made by the entire rigid bodies 40 with respect to the center of rotation 35 is obtained from the following equation.

$$\theta_T = (n-1)\theta_e \quad \text{[Equation 2]}$$

In FIG. 3, since the unbalanced mass Mu is distributed in the Y-axis direction, the compensation mass mT of the Y-axis direction of the rigid bodies 40 can be expressed by the following Equations 3 and 4. Here, Equation 3 indicates a case in which there is an odd number of rigid bodies 40, while Equation 4 indicates a case in which there is an even number of rigid bodies 40.

$$m_T = m + 2m \sum_{k=1}^{\frac{(n-1)}{2}} \cos k\theta_e \quad \text{[Equation 3]}$$

$$m_T = 2m \sum_{k=1}^{\frac{n}{2}} \cos\left(k - \frac{1}{2}\right)\theta_e \quad \text{[Equation 4]}$$

Figure 4:
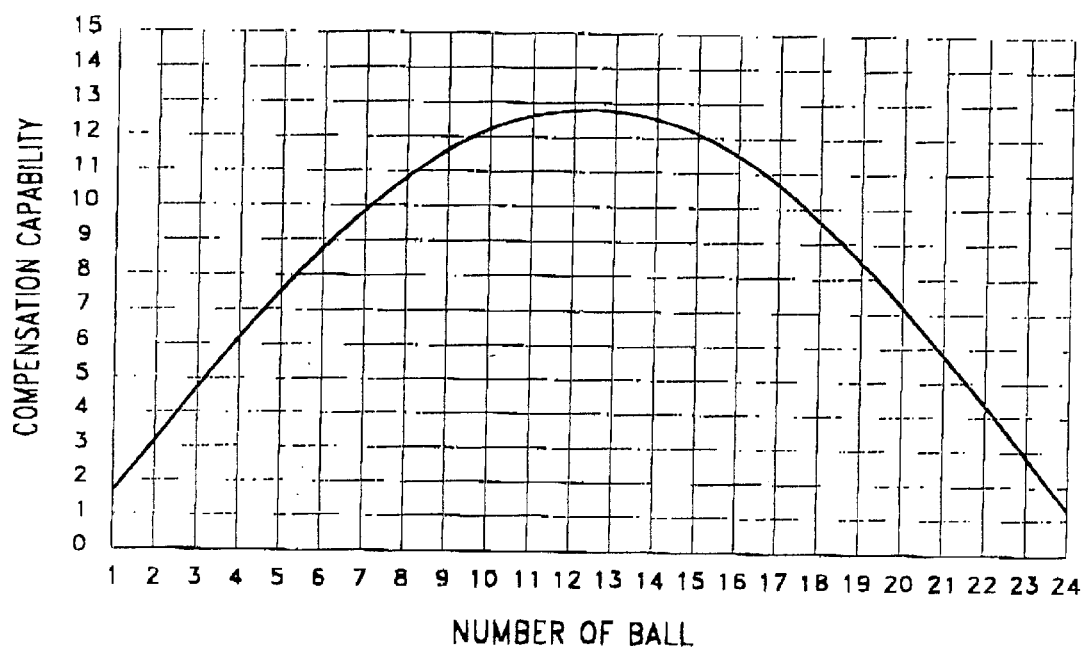
FIG. 4 is a graph indicating the compensation capability according to the number of rigid bodies of the self-compensating dynamic balancer.

FIG. 4 is a graph showing the compensation capability according to the number of rigid bodies 40 obtained from the above Equations 1 through 4 when the mass m of each rigid body is 0.13 g, the diameter D of each rigid body is 25 mm, the diameter d of each rigid body 3.175 mm. In a case satisfying the above conditions, 1 to 24 rigid bodies 40 can be inserted in the race 21. It can be seen that the number of rigid bodies 40 to obtain the compensation capability of about 2 to 12 gmm is not only 1 to 12 but also 13 to 24.

Figure 5:
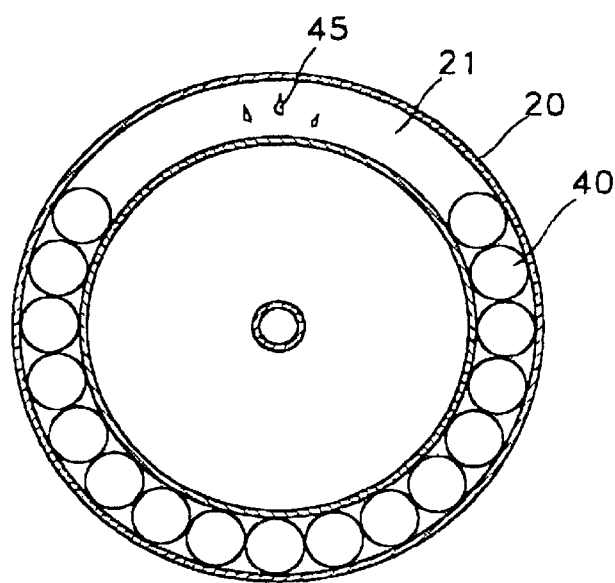
FIG. 5 is a sectional view showing a self-compensating dynamic balancer taken along line V—V' of FIG. 1 and constructed as a preferred embodiment of the present invention.

Thus, as shown in FIG. 5, there are enough rigid bodies 40 to occupy at least half of the inner space of the race 21, for example, about 13 to 24 rigid bodies 40. The rigid bodies 40, when touching together in an array within the race 21, subtend on arc of the race 21 greater than 180°. As the frictional force of some rigid bodies 40 against the race 21 increases, most of the other rigid bodies 40 move in a direction for compensating for the unbalanced mass Mu, thus restricting abnormal movements.

Particularly, when a great eccentric mass Mce rotates together with the main body, overall balancing is performed as the rigid bodies 40 are located at the opposite side of the eccentric mass Mce with respect to the center Cn of rotation 35 while fine balancing is performed as some of the rigid bodies 40 located in an unoccupied space in the race 21 or located in same side of the eccentric mass Mce with respect to the center Cn of rotation 35 move freely.

Also, in the self-compensating dynamic balancer according to the present invention, it is preferable that a small amount of lubricant 45, such as oil, is injected in the race 21 such that the lubricant 45 can cover the surface of the rigid bodies 40 to a thickness of a few micrometers. Thus, during rotation of the rotating body, the frictional force between the surface of the race 21 and the rigid bodies 40 is reduced so that balancing capability is improved.

As described above, since the self-compensating dynamic balancer according to the present invention is provided with rigid bodies 40 occupying half of the inner space of the race 21, imbalance caused by the friction between the rigid bodies and the race can be remarkably reduced Thus, the balancing capability can be increased and reproducibility can be improved.

For example, disc drivers need to rotate discs with extremely accurate speed and precise balance in order to read data stored on the disc. The present invention can be used in said disc drivers. Then the driver can get self-compensating balancing quicker than a conventional disc driver.

It is noted that the present invention is not limited to the preferred embodiment described above, and it is apparent that variations and modifications by those skilled in the art can be effected within the spirit and scope of the present invention defined in the appended claims.

What is claimed is:

1. A self-compensating balancer, comprising:
   a rotatable body rotating by a driving source, said rotatable body disposed to revolve around an axis passing through a center of said rotatable body;
   a case centered on said axis, formed on said rotatable body, having a hollow circular race; and
   a number of rigid bodies contained within said race, said rigid bodies having mutual relations of mass, diameter and rotational speed of said rotatable body as follows:

$$M = m + 2m \sum_{k=1}^{\frac{(n-1)}{2}} \cos k * \theta_e \text{ when } n = \text{an odd number, or}$$

when n=an odd number, or $$M = 2 * m \sum_{k=1}^{\frac{n}{2}} \cos\left(k - \frac{1}{2}\right) * \theta_e \text{ when } n = \text{an even number}$$

when n=an even number
   wherein n=number of said rigid bodies, k=an integer, m=mass of each of said rigid bodies, M=total mass of said rigid bodies, $\theta_e$=an angle between two radial lines intersecting said axis and neighboring rigid bodies.

2. The self-compensating balancer of claim 1, wherein said number of rigid bodies occupies at least half of said race.

3. The self-compensating balancer of claim 1, wherein said number of rigid bodies occupies approximately half of said race.

4. The self-compensating balancer of claim 1, wherein said number of rigid bodies occupies more than half of said race.

5. The self-compensating balancer of claim 1, wherein said rigid bodies, when touching together in an array within said race, subtend an arc of said race greater than 180°.

6. The self-compensating balancer of claim 1, further comprised of a lubricant covering the surface of said rigid bodies and said race, to a thickness of a couple of micrometers.

7. The self-compensating balancer of claim 1, with said rotatable body revolving around a second axis deviated from said axis of said center.

8. The self-compensating balancer of claim 1, with said rotatable body comprising a cover member and a main body attached to said cover member and having said hollow circular race.

9. The self-compensating balancer of claim 1, with said rotatable body comprising a case including an upper side, lower side, an inner side, and an outer side forming said hollow circular race.

10. The self-compensating balancer of claim 9, with said case comprising:

a cover member and a main body attached to said cover member;

a first circumferential side extended from said cover member;

a second circumferential side extended from said main body; and said first and second circumferential sides forming said outer side.

11. The self-compensating balancer of claim 10, with said first and second circumferential sides overlapping each other within a portion of outer side.

12. The self-compensating balancer of claim 10, with said outer side comprising a seam formed between each end of said first and second circumferential sides, said seam disposed within a surface of said outer surface not to contact said rigid bodies.

* * * * *